(12) United States Patent
Heiler et al.

(10) Patent No.: US 6,348,507 B1
(45) Date of Patent: Feb. 19, 2002

(54) SURFACE TREATMENT OF SILICONE HYDROGEL CONTACT LENSES

(75) Inventors: David J. Heiler, Avon; Suzanne F. Groemminger, Rochester; John Denick, Jr., Pittsford; Lisa C. Simpson, Rochester, all of NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

(21) Appl. No.: 09/305,609

(22) Filed: May 5, 1999

Related U.S. Application Data

(60) Provisional application No. 60/084,333, filed on May 5, 1998.

(51) Int. Cl.⁷ .................................................. A61K 47/00
(52) U.S. Cl. ........................................................ 514/769
(58) Field of Search .................... 514/769; 206/5.1; 264/2.6; 422/300, 26; 351/160; 427/489, 498

(56) References Cited

U.S. PATENT DOCUMENTS

| | | | |
|---|---|---|---|
| 3,350,216 A | 10/1967 | McVannel et al. ............ 117/47 |
| 3,637,416 A | 1/1972 | Misch et al. ................. 117/72 |
| 3,708,225 A | 1/1973 | Misch et al. ................ 351/160 |
| 3,708,416 A | 1/1973 | Reuhlen et al. ............ 204/284 |
| 3,814,051 A | 6/1974 | Lewison ...................... 118/49 |
| 3,956,030 A | * 5/1976 | Lee et al. ..................... 148/27 |
| 3,959,105 A | 5/1976 | Feneberg et al. ........... 204/165 |
| 4,055,378 A | 10/1977 | Feneberg et al. ........... 351/160 |
| 4,065,324 A | 12/1977 | Rankin ........................ 134/30 |
| 4,089,795 A | * 5/1978 | Bailey et al. ................ 510/356 |
| 4,122,942 A | 10/1978 | Wolfson ...................... 206/5.1 |
| 4,127,423 A | 11/1978 | Rankin ........................ 134/30 |
| 4,143,575 A | 3/1979 | Oliver ......................... 84/1.16 |
| 4,143,949 A | 3/1979 | Chen .......................... 351/160 |
| 4,168,002 A | * 9/1979 | Crosby ..................... 206/459.5 |
| 4,214,014 A | 7/1980 | Hofer et al. .................. 427/40 |
| 4,216,860 A | * 8/1980 | Heimann .................... 206/370 |
| 4,217,038 A | 8/1980 | Letter et al. ................ 351/160 |
| 4,230,595 A | * 10/1980 | Yamaji et al. ......... 252/188.28 |
| 4,312,575 A | 1/1982 | Peyman et al. ............. 351/160 |
| 4,632,844 A | 12/1986 | Yanagihara et al. .......... 427/38 |
| 4,830,783 A | * 5/1989 | Ellis et al. .................. 510/113 |
| 5,080,924 A | 1/1992 | Kamel et al. .................. 427/2 |
| 5,326,584 A | 7/1994 | Kamel et al. ............... 427/534 |
| 5,476,614 A | * 12/1995 | Adamy et al. .............. 510/424 |
| 5,648,074 A | * 7/1997 | Park et al. .................. 424/94.2 |
| 5,778,638 A | * 7/1998 | Watanabe et al. ............. 53/432 |
| 6,069,122 A | * 5/2000 | Vinson et al. ............... 510/235 |

FOREIGN PATENT DOCUMENTS

| | | | |
|---|---|---|---|
| EP | 0 482 525 A3 1 | 10/1991 | |
| EP | 0 593 988 A1 | 4/1994 | ............ B05D/7/24 |
| EP | WO 95/04609 | 2/1995 | |
| JP | 08227001 | 9/1996 | ............ G02B/1/10 |

OTHER PUBLICATIONS

R.Erb, Method for Producing Wettable Surfaces et al. by Robert A. Erb, AFSAM Report 61–42, AD 257290, NTIS, The Franklin Institute, Jun. 30, 1960.

\* cited by examiner

*Primary Examiner*—Zohreh Fay
*Assistant Examiner*—Brian-Yong Kwon
(74) *Attorney, Agent, or Firm*—Robert B. Furr, Jr.; Denis A. Polyn

(57) ABSTRACT

The present invention provides an optically clear, hydrophilic coating upon the surface of a silicone hydrogel lens by plasma treating the lens and subsequently heating the lens in an aqueous solution containing a surface-protective agent.

4 Claims, 5 Drawing Sheets

(2a) VYNAGEL-AUTOCLAVED
RMS=10nm ANTERIOR 005aa01.107

(4b) VYNAGEL-0.5%
RMS=34nm ANTERIOR 007ba01.138

NANOSCOPE　　　　　　　　CONTACT AFM
SCAN SIZE　　　　　　　　　50.00nm
SETPOINT　　　　　　　　　 7.150
SCAN RATE　　　　　　　　　4.069 Hz
NUMBER OF SAMPLES　　512

SURFACE TREATMENT OF SILICONE HYDROGEL CONTACT LENSES

This application claims priority from U.S. Provisional Application Ser. No. 60/084,333 filed on May 5, 1998.

FIELD OF THE INVENTION

The present invention is directed toward surface treatment of silicone hydrogel contact lenses. More specifically, the present invention provides an optically clear, hydrophilic coating upon the surface of a silicone hydrogel lens by subjecting the surface of the lens to an oxidative plasma followed by treatment with a dilute aqueous solution comprising a silicate salt, silicic acid, colloidal silicon dioxide, or combinations thereof. The invention is also directed to a buffered, sterile solution containing a soluble silicate that can be used to both treat and store a silicone hydrogel contact lens.

BACKGROUND

Contact lenses made from silicone-containing materials have been investigated for a number of years. Such materials can generally be subdivided into two major classes, namely hydrogels and non-hydrogels. Non-hydrogels do not absorb appreciable amounts of water, whereas hydrogels can absorb and retain water in an equilibrium state. Regardless of their water content, both non-hydrogel and hydrogel silicone contact lenses tend to have relatively hydrophobic, non-wettable surfaces.

Those skilled in the art have long recognized the need for modifying the surface of such silicone contact lenses so that they are compatible with the eye. It is known that increased hydrophilicity of the contact lens surface improves the wettability of the contact lenses. This in turn is associated with improved wear comfort of contact lenses. Additionally, the surface of the lens can affect the lens's susceptibility to deposition, particularly protein and lipid deposition from the tear fluid during lens wear. Accumulated deposition can cause eye discomfort or even inflammation. In the case of extended wear lenses, the surface is especially important since extended wear lens must be designed for high standards of comfort over an extended period of time, without requiring daily removal of the lens before sleep. Thus, the regimen for the use of extended wear lenses would not provide a daily period of time for the eye to recover from any discomfort or other possible adverse effects of lens wear The patent literature has disclosed various surface treatments for rendering the surface of silicone lenses more hydrophilic and more wettable, including changing the chemistry of the surface layer, coating the surface, and compounding the polymer with additives that subsequently diffuse to the surface.

Among chemical surface modification techniques are non-polymeric plasma treatments and corona treatments. This includes etching or the selective destruction of a surface layer. Surface modification techniques also include the introduction of functional groups onto a surface layer, for example the introduction of oxygenated functions (hydroxyls, carboxyls, etc.) at the surface of organic polymeric materials for the purpose of increasing hydrophilicity, thereby promoting increased wettability. Such techniques may employ flame treatments, corona treatments, or plasma treatments. Plasma treatments, also referred to as radio frequency gas discharge (RFGD), have been increasingly studied for the modification of surfaces. The plasma gas of RFGD contains vacuum UV radiation plus many reactive species, such as free radicals and energetic electrons and ions. Depending on the gas or vapor used in the plasma and the process conditions, the effects of non-polymeric or non-depositing plasma treatment include surface etching or ablation, oxidation, the formation of reactive groups, and combinations thereof.

Silicone lenses have been subjected to plasma surface treatment to improve their surface properties, e.g., surfaces have been rendered more hydrophilic, deposit resistant, scratch resistant, etc. Examples of previously disclosed plasma surface treatments include subjecting contact lens surfaces to a plasma comprising an inert gas or oxygen (see, for example, U.S. Pat. Nos. 4,055,378; 4,122,942; and 4,214,014).

Another type of chemical surface modification that has been disclosed in the patent literature involves the introduction of functional groups absent in the parent polymer by the grafting or immobilization of molecules, oligomers, or polymers onto a surface. Grafting or immobilization typically involves, first, the formation of a grafting site which may comprise the formation of a radical by means of chemical reactions, UV irradiation, ionizing radiation, plasma treatment, or the like. The next step is the reaction of the species to be grafted or immobilized with the active site. Surface grafting typically involves the propogation of the reaction to form an anchored chain, wherein competing solution and interfacial reactions occur. Surface crosslinking may occur.

Coating a lens usually involves adhesion of a surface layer onto the substrate being coated. The coated layer can be relatively thick and its physical characteristics can be significantly different than those of the substrate. For coatings that involve high-energy species, for example, evaporation, sputtering, plasma polymerization, the initial stages of the treatment can involve a surface treatment. A carbon coating can be formed by various hydrocarbon monomers (see for example U.S. Pat. No. 4,143,949) or combinations of oxidizing agents and hydrocarbons, e.g. water and ethanol. See, for example, WO 95/04609 and U.S. Pat. No 4,632,844. Sequential plasma surface treatments are known, for example a first treatment with a plasma of an inert gas or oxygen, followed by a hydrocarbon plasma. See, for example, U.S. Pat. No. 5,326,584. U.S. Pat. No. 4,312, 575 to Peyman et al. discloses a process for providing a barrier coating on a silicone or polyurethane lens by subjecting the lens to an electrical glow discharge (plasma) process conducted by first subjecting the lens to a hydrocarbon atmosphere followed by subjecting the lens to oxygen during flow discharge. U.S. Pat. No. 4,143,949 discloses depositing an ultrathin coating of a hydrophilic polymer by polymerizing a vapor of a hydrophilic monomer such as hydroxyalkylmethacrylate under electrodeless (corona) gas discharge conditions.

Non-plasma techniques for forming a coating have been disclosed. For example, U.S. Pat. No. 3,814,051 to Lewison discloses vacuum bonding a uniform hydrophilic quartz surface to a contact lens by vaporizing quartz, namely silicon dioxide, within a high vacuum chamber. The coating of contact lenses by dipping, swabbing, spraying or other mechanical means has been disclosed in U.S. Pat. Nos. 3,637,416 and 3,708,416 to Misch et al. The latter patents disclose a chemical process in which a coupling film-forming organic silicon compound, a vinyl trichlorosilane, is applied to a silicone surface, followed by a silica or silica gel deposit formed by contact with a silicon halide such as tetrachlorosilane or with a silicic ester, more particularly a tetraalkoxysilane. Solutions of such compounds can also be applied in a single step to a contact lens by dipping or the like. In U.S. Pat. No. 3,708,225, Misch et al. states that the capabilities of such solutions can be enhanced by incorporating a small amount of colloidal silica, preferably about 1 to 5 percent, whereby the solutions tend to thicken and become easier to apply, further facilitating the buildup of a silica or silica gel deposit.

U.S. Pat. No. 3,350,216 to McVannel et al. discloses rendering a rubber contact lens hydrophilic by dipping the lens into a solution of a titanate having the formula Ti(OR)$_4$ wherein R is an alkyl group containing 2 to 4 carbon atoms.

Although such surface treatments have been disclosed for modifying the surface properties of silicone contact lenses, the results have been problematic or of questionable commercial viability, which has no doubt contributed to the fact that silicone hydrogel contact lens have yet to be commercialized. For example, U.S. Pat. No. 5,080,924 to Kamel et al. states that although exposing the surface of an object to plasma discharge with oxygen is known to enhance the wettability or hydrophilicity of such surface, such treatment is only temporary.

Although the prior art has attempted to show that the surface treatment of contact lenses in the unhydrated state can be accomplished, there has been little or no discussion of the possible effect of subsequent processing or manufacturing steps on the surface treatment of the lens and no teaching or description of the surface properties of a fully processed hydrogel lens manufactured for actual wear. Similarly, there has been little or no published information regarding the performance of coatings for silicone hydrogel or extended wear lenses in the human eye.

Thus, it is desirable to provide a silicone hydrogel contact lens with an optically clear, hydrophilic surface coating that will not only exhibit improved wettability, but which will generally allow the use of a silicone hydrogel contact lens in the human eye, preferably for an extended period of time. In the case of a silicone hydrogel lens for extended wear, it would be highly desirable to provide a contact lens with a surface that is also highly permeable to oxygen and water. Such a surface treated lens would be comfortable to wear in actual use and would allow for the extended wear of the lens without irritation or other adverse effects to the cornea. It would be desirable if such a surface treated lens were a commercially viable product capable of economic manufacture.

SUMMARY OF THE INVENTION

The present invention is directed to a silicone hydrogel contact lens having a silicate-containing coating and a method of manufacturing the same, which coating is hydrophilic and resistant to protein and lipid deposition. The invention is also directed to a method of maintaining the silicate-containing coating, formed by plasma treatment on a dry lens, during subsequent processing or manufacturing, including lens hydration and heat sterilization.

In one embodiment of the invention, the method comprises treating the lens during autoclaving, subsequent to plasma treatment, with a silicon-containing aqueous solution comprising a silicate salt, silicic acid, and/or colloidal silicon-dioxide. Treatment can be achieved during lens manufacture by submerging the lens in the surface-protective, silica-containing or silica-producing aqueous solution, preferably during lens hydration, followed by heating at an elevated temperature. (By the term solution is broadly meant true solutions as well as colloidal particles in solution, which colloids may be formed by supersaturated solutions.)

In a preferred embodiment, the lens is packaged in a silicon-containing solution and the final package is autoclaved for sterilization purposes. It has been found that the silicon-containing solution reduces or prevents the delamination of the silicate coating on the lens during autoclaving, protects against coating deterioration during storage, and increases the hydrophilicity or wettability of the lens. A solution according to the present invention can, therefore, be used as a packaging solution for storage of a lens prior to customer use. Since such a solution has been shown safe for use in the eye, so that a lens packaged in the solution may be placed in the eye without rinsing.

DETAILED DESCRIPTION OF THE INVENTION

Figure 1:
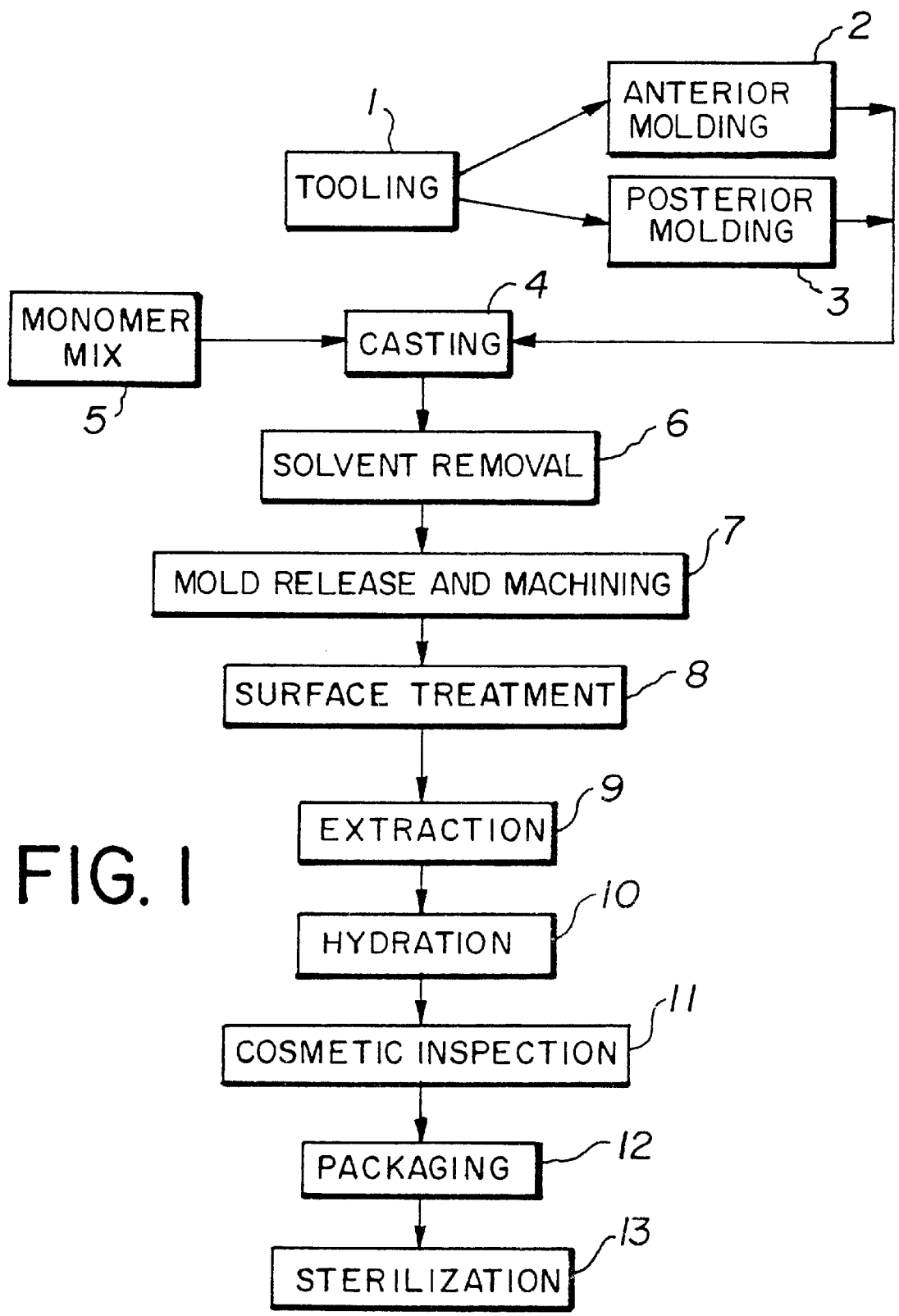
FIG. 1 is a flow chart of a manufacturing process for making a lens having a lens coating according to the present invention.

As mentioned above, the present invention is directed toward the surface treatment of a silicone hydrogel contact lenses in order to allow the lens which otherwise could not be worn in the eye to be worn in the eye for an extended period of time, preferably for extended wear use. A silicate-containing coating is first formed, preferably by oxidative plasma treatment. Such plasma treatment of silicone hydrogel lenses is complicated by the fact that, although such lenses are plasma treated in an unhydrated state, subsequently such lenses, unlike their non-hydrogel counterparts, must be hydrated. Hydration of the lenses can cause the shape of the lens to change after coating. In fact, hydration may cause the lens to swell from about 10 to more than about 20 percent, depending upon the water content of the lens. Such lens swelling and subsequent autoclaving, a common form of sterilizing lenses during the manufacture of packaged lenses, have been found to substantially affect the plasma modified surface of a silicone hydrogel lens. The present invention can be used to prevent destruction of the previously applied coating (including its desired properties) to which such coatings may be prone during thermal and hydrodynamic stress or expansion. For example, the use of solutions according to the present invention, for autoclaving the packaged lens, has been found to prevent or decrease damage to the coating following hydration (swelling) and during autoclaving (heating), which damage is believed due to cohesive (between the coating and the lens material) or adhesive failure (within the coating) resulting in delamination of the coating material.

As mentioned above, therefore, the present invention is directed to the manufacture of a hydrophilic surface coating on a silicon hydrogel lens which coating is durable during and after manufacture and which coating renders the lens wettable and allows the lens to be comfortably worn for extended periods of time. In particular, the invention is directed to treatment of the lens following plasma oxidation with a silicon-containing aqueous solution. In one embodiment of the invention, the solution is used to maintain and prevent undue delamination of the plasma-formed silicate-containing coating during autoclaving. Although the removal of some portion of the silicate-containing coating during autoclaving can be integrated into the overall process for manufacturing the lens, it is important that the coating not be completely removed. Also, it is desired that sufficient coating thickness remain so that uncoated regions of the lens resulting from cracks in the coating, where the exposed surface is relatively hydrophobic, are sufficiently distanced from eye tissue. It has been discovered that if a silicon-containing agent, for example, a silicate salt, the free acid thereof or a colloidal silicon dioxide (including precursors thereof) is contained in the solution in which the lens is immersed during autoclaving, the thickness and hydrophilicity of the coating is retained to a much larger extent than otherwise.

Commercially soluble silicates include silicate salts. A preferred silicate is the alkali metal silicate having the general formula $M_2O \cdot mSiO_2 \cdot nH_2O$, where M is an alkali metal, preferably Na (sodium), and m and n is the number of moles of $SiO_2$ (silica) and $H_2O$, respectively, per mole of $M_2O$. The distribution of silicate species in aqueous sodium silicate solutions have long been of interest, and it is presently believed that silicate solutions contain a complex mixture of silicate anions in dynamic equilibrium. The composition of commercial alkali silicates is typically described by the weight ratio of $SiO_2$ to $M_2O$. These materials are usually manufactured as glasses that dissolve in water to form viscous, alkaline solutions. The ratio of $SiO_2$ to $M_2O$ in commercial sodium silicate products typically varies from 0.5 to 4.0. A common form of soluble silicate, sometimes called waterglass, has a ratio of 3.2. Lower ratios of $M_2O$ are preferred for use in this invention, for example, the sodium silicate coating a $SiO_2$ to $M_2O$ ratio of 2.9 commercially available as Solution K from PQ Corp. (City, State).

Silicate solutions, particularly sodium silicate solutions are preferred for use in the present invention. The pH of the silicate solution used to treat the silicone hydrogel lens is suitably around pH 7, preferably between about 6 to 8. Since sodium silicates are commercially available in alkaline form for increased solubility, a sodium silicate solution many be formed by neutralizing, by means of acidifying an alkaline solution of the silicate, for example, by changing the pH from about 10–11 to about 8. As a result of lowering the pH, the solution becomes potentially silica-containing according to the following equation (I):

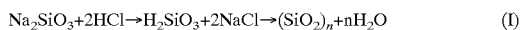

$Na_2SiO_3 + 2HCl \rightarrow H_2SiO_3 + 2NaCl \rightarrow (SiO_2)_n + nH_2O$      (I)

In accordance with the above equation, it is apparent that silicic acid can also be used to form silica. Thus, silicates and silicic acid are considered herein to be precursors of a silica-containing compound, silica or a polymer $(SiO_2)_n$ thereof, or in other words, a colloidal silica that can protect the lens surface. Without wishing to be bound by theory, it is believed that the presence of silica in the solutions, especially if in saturate or supersaturated, prevents the silicate in the lens coating from leaving the coating and entering the solution.

A colloidal silica or silicon dioxide material may be employed directly as a silica-containing material. Such materials are commercially available under various trade designations, including Cab-O-Sil® (Cabot Company), Santocel® (Monsanto), Ludox® (DuPont), and the like.

The invention is advantageous for application to silicone hydrogel contact lenses that have been subjected to oxidative plasma treatment to form a silicate-containing surface film or coating, especially lenses intended for extended wear. By oxidative plasma is meant a plasma that increases the amount of oxygen at the surface and increases the amount of silicate species, thereby tending to make the surface more glass-like or hydrophilic. Preferably, oxidative plasma is accomplished with an oxygen-containing atmosphere.

The present invention is applicable to a wide variety of silicone hydrogel materials. Hydrogels in general are a well known class of materials which comprise hydrated, cross-linked polymeric systems containing water in an equilibrium state. Silicone hydrogels generally have a water content greater than about 5 weight percent and more commonly between about 10 to about 80 weight percent. Such materials are usually prepared by polymerizing a mixture containing at least one silicone-containing monomer and at least one hydrophilic monomer. Typically, either the silicone-containing monomer or the hydrophilic monomer functions as a crosslinking agent (a crosslinker being defined as a monomer having multiple polymerizable functionalities) or a separate crosslinker may be employed. Applicable silicone-containing monomeric units for use in the formation of silicone hydrogels are well known in the art and numerous examples are provided in U.S. Pat. Nos. 4,136,250; 4,153,641; 4,740,533; 5,034,461; 5,070,215; 5,260,000; 5,310,779; and 5,358,995.

Another class of representative silicon-containing monomers includes silicone-containing vinyl carbonate or vinyl carbamate monomers such as: 1,3-bis[4-vinyloxycarbonyloxy)but-1-yl]tetramethyl-disiloxane; 3-(trimethylsilyl)propyl vinyl carbonate; 3-(vinyloxycarbonylthio)propyl-[tris(trimethylsiloxy)silane]; 3-[tris(trimethylsiloxy)silyl] propyl vinyl carbamate; 3-[tris(trimethylsiloxy)silyl] propyl allyl carbamate; 3-[tris(trimethylsiloxy)silyl]propyl vinyl carbonate; t-butyldimethylsiloxethyl vinyl carbonate; trimethylsilylethyl vinyl carbonate; and trimethylsilylmethyl vinyl carbonate.

Another class of silicon-containing monomers includes polyurethane-polysiloxane macromonomers (also sometimes referred to as prepolymers), which may have hard-soft-hard blocks like traditional urethane elastomers. They may be end-capped with a hydrophilic monomer such as HEMA. Examples of such silicone urethanes are disclosed in a variety or publications, including Lai, Yu-Chin, "The Role of Bulky Polysiloxanylalkyl Methacryates in Polyurethane-Polysiloxane Hydrogels," *Journal of Applied Polymer Science*, Vol. 60, 1193–1199 (1996). PCT Published Application No. WO 96/31792 discloses examples of such monomers, which disclosure is hereby incorporated by reference it its entirety.

A preferred silicone hydrogel material comprises (in bulk formula, that is, in the monomer mixture that is copolymerized) 5 to 50 percent, preferably 10 to 25, by weight of one or more silicone macromonomers, 5 to 75 percent, preferably 30 to 60 percent, by weight of one or more polysiloxanylalkyl (meth)acrylic monomers, and 10 to 50 percent, preferably 20 to 40 percent, by weight of a hydrophilic monomer, as a percentage of the hydrogel polymer material. In general, the silicone macromonomer is a poly(organosiloxane) capped with an unsaturated group at one or more ends of the molecule, typically two or more ends for copolymerization. In addition to the end groups in the above structural formulas, U.S. Pat. No. 4,153,641 to Deichert et al. discloses additional unsaturated groups, including acryloxy or methacryloxy. Preferably, the silane macromonomer is a silicon-containing vinyl carbonate or vinyl carbamate or a polyurethane-polysiloxane having one or more hard-soft-hard blocks and end-capped with a hydrophilic monomer.

Suitable hydrophilic monomers for use in silicone hydrogels include, for example, unsaturated carboxylic acids, such as methacrylic and acrylic acids; acrylic substituted alcohols, such as 2-hydroxyethylmethacrylate and 2-hydroxyethylacrylate; vinyl lactams, such as N-vinyl pyrrolidone; and acrylamides, such as methacrylamide and N,N-dimethylacrylamide. Still further examples are the hydrophilic vinyl carbonate or vinyl carbamate monomers disclosed in U.S. Pat. Nos. 5,070,215, and the hydrophilic oxazolone monomers disclosed in U.S. Pat. No. 4,910,277. Other suitable hydrophilic monomers will be apparent to one skilled in the art.

By the term oxidative plasma is meant a plasma that increases the oxygen content of the surface and/or increases the silicate content so the surface is more hydrophilic and glass-like in character. Preferably, the oxidative plasma employs an oxygen-containing gas such as water, peroxide, molecular oxygen, air, or combinations thereof. Without wishing to be bound by theory, it is theorized that the silicate coating in the final product has sufficient silicate content to provide the desired surface properties, such as wettability and deposition resistance, and yet sufficient polymer content to allow flexibility during hydration or swelling and good interfacial cohesion during heat sterilization to prevent delamination. The chemistry of the silicate film in the product is not completely made of silicate and some of the original polymer material may remain in modified form.

In order to form a silicate-containing coating by oxidative plasma on a particular silicone hydrogel material, the lens may initially be treated under two widely diverse plasma set of conditions, a first "low and slow" plasma treatment and a second "hot and fast" plasma treatment. If following plasma treatment, hydration, and heat sterilization ("full processing"), a silicate coating can be obtained under either set of conditions, then further adjustment of the process conditions can ordinarily achieve a satisfactory silicate-containing coating. In general, a "low and slow" surface treatment tends to be relatively more effective for a relatively higher silicon-containing lens and a "hot and fast" surface treatment is relatively more effective for a relatively lower silicon-containing lens. By "low and slow" surface treatment is meant relatively lower time, higher pressure, and lower wattage to relatively minimize disruption of covalent bonds while modifying the substrate, thereby leaving more polymer at the coating interface with the lens material. Exemplary "low and slow" conditions for plasma treatment (in a plasma chamber such as used in the following examples) are 100 watts at 0.3 to 0.6 torr, 1–2 minutes per side, with 100 to 300 sccm in an air/water/peroxide atmosphere (air bubbled through 8% peroxide solution in HPLC grade water). By "hot and fast" treatment is meant relatively higher wattage, lower pressure, and longer time to maximize the surface modification. Exemplary "hot and fast" conditions for plasma treatment are 400 watts at 0.1 to 0.4 torr, 10 minutes per side, with 200 to 500 sccm (standard cubic centimeters per minute) in the above-indicated atmosphere. The existence of a silicate coating can be evidenced by a recognizable or statistically significant change in the surface roughness (RMS), by a visual change in the surface morphology as evidenced by AFM, such as the formation of surface plates, or by a statistically significant difference in the XPS data for a lens before treatment compared to a lens fully processed, notably by a difference in the oxygen and/or silicon content (including the appearance of a silicate peak in the XPS analysis.) A preferred test for the formation of a coating is a change of at least 1 to 5% in the oxygen content, within a 95% confidence level. As indicated above, if any silicate coating in the fully processed lens (following hydration and heat sterilization) can be formed by either "low and slow" treatment conditions or "hot and fast" treatment conditions, then it is generally possible to make further process adjustments to achieve the desired coating specifications. An example of a particular plasma treatment to form a silicate-containing coating is disclosed in co-assigned, copending U.S. Ser. No. 60/084,333 filed on even day herewith, hereby incorporated by reference.

Manufacture of the lens. Contact lenses according to the present invention can be manufactured, employing various conventional techniques, to yield a shaped article having the desired posterior and anterior lens surfaces. Spincasting methods are disclosed in U.S. Pat. Nos. 3,408,429 and 3,660,545; preferred static casting methods are disclosed in U.S. Pat. Nos. 4,113,224 and 4,197,266. Curing of the monomeric mixture is often followed by a machining operation in order to provide a contact lens having a desired final configuration. As an example, U.S. Pat. No. 4,555,732 discloses a process in which an excess of a monomeric mixture is cured by spincasting in a mold to form a shaped article having an anterior lens surface and a relatively large thickness. The posterior surface of the cured spincast article is subsequently lathe cut to provide a contact lens having the desired thickness and posterior lens surface. Further machining operations may follow the lathe cutting of the lens surface, for example, edge finishing operations.

FIG. 1 illustrates a series of manufacturing process steps for static casting of lenses, wherein the first step is tooling (1) whereby, based on a given lens design, metal tools are fabricated by traditional machining and polishing operations. These metal tools are then used for injection or compression molding to produce a plurality of thermoplastic molds which in turn are used to cast the desired lenses from polymerizable compositions. Thus, a set of metal tools can yield a large number of thermoplastic molds. The thermoplastic molds may be disposed after forming a single lens. The metal molds fabricated during tooling (1) is then used for anterior molding (2) and posterior molding (3) in order to produce, respectively, an anterior mold section for forming the desired anterior lens surface and a posterior mold section for forming the desired posterior lens surface. Subsequently, during the operation of casting (4), a monomer mixture (5) is injected into the anterior mold section, and the posterior mold section is pressed down and clamped at a given pressure to form the desired lens shape. The clamped molds may be cured by exposure to UV light or other energy source for a certain period of time, preferably by conveying the molds through a curing chamber, after which the clamps are removed.

After producing a lens having the desired final shape, it is desirable to remove residual solvent from the lens before edge finishing operations. This is because, typically, an organic diluent is included in the initial monomeric mixture in order to minimize phase separation of polymerized products produced by polymerization of the monomeric mixture and to lower the glass transition temperature of the reacting polymeric mixture, which allows for a more efficient curing process and ultimately results in a more uniformly polymerized product. Sufficient uniformity of the initial monomeric mixture and the polymerized product are of particular concern for silicone hydrogels, primarily due to the inclusion of silicone-containing monomers which may tend to separate from the hydrophilic comonomer. Suitable organic diluents include, for example, monohydric alcohols, with $C_6$–$C_{10}$ straight-chained aliphatic monohydric alcohols such as n-hexanol and n-nonanol being especially preferred; diols such as ethylene glycol; polyols such as glycerin; ethers such as diethylene glycol monoethyl ether; ketones such as methyl ethyl ketone; esters such as methyl enanthate; and hydrocarbons such as toluene. Preferably, the organic diluent is sufficiently volatile to facilitate its removal from a cured article by evaporation at or near ambient pressure. Generally, the diluent is included at 5 to 60% by weight of the monomeric mixture, with 10 to 50% by weight being especially preferred.

The cured lens is, then, subjected to solvent removal (6) in the process of FIG. 1, which can be accomplished by evaporation at or near ambient pressure or under vacuum. An elevated temperature can be employed to shorten the time necessary to evaporate the diluent. The time, temperature and pressure conditions for the solvent removal step will vary depending on such factors as the volatility of the diluent and the specific monomeric components, as can be readily determined by one skilled in the art. According to a preferred embodiment, the temperature employed in the removal step is preferably at least 50° C., for example, 60 to 80° C. A series of heating cycles in a linear oven under inert gas or vacuum may be used to optimize the efficiency of solvent removal. The cured article after the solvent removal step should contain no more than 20% by weight of solvent, preferably no more than 5% by weight or less.

Following removal of the solvent, the lens is next subjected to mold release and optional machining operations (7) according to the process of FIG. 1. The machining step includes, for example, buffing or polishing the lens edge and/or surface. Generally, such machining processes may be performed before or after the lens is released from the mold part. Preferably, the lens is dry released from the mold by employing vacuum tweezers to lift the lens from the mold, after which the lens is transferred by means of mechanical tweezers to a second set of vacuum tweezers and placed against a rotating surface to smooth the surface or edges. The lens may then be turned over in order to machine the other side of the lens.

Subsequent to the mold release/machining operations (7), the lens is subjected to surface treatment (8), preferably an oxidative RF plasma treatment of the lens surface employing an oxygen-containing gas. Plasma treatment involves passing an electrical discharge through a gas at low pressure. The electrical discharge is usually at radio frequency (typically, 13.56 MHz), although microwave and other frequencies can be used. This electrical discharge is absorbed by atoms and molecules in their gas state, thus forming a plasma which interacts with the surface of the contact lens.

An oxidizing plasma, e.g., employing $O_2$, (oxygen gas), water, hydrogen peroxide, air, etc., or mixtures thereof, may be used to etch the surface of the lens, creating radicals and oxidized functional groups. Such oxidation is known to render the surface of a silicone lens more hydrophilic. Alternatively, the plasma conditions of the present invention may be adjusted to obtain the desired combination of ablation and oxidation of the surface material such that a relatively thicker coating is achieved in the final product.

A plasma for the surface modification of the lens is initiated by a low energy discharge. Collisions between energetic free electrons present in the plasma cause the formation of ions, excited molecules, and free radicals. Such species, once formed, can react with themselves in the gas phase as well as with further ground-state molecules. The plasma treatment may be understood as an energy dependent process involving energetic gas molecules. For chemical reactions to take place at the surface of the lens, one needs the required species (element or molecule) in terms of charge state and particle energy. Radio frequency plasmas generally produce a distribution of energetic species. Typically, the "particle energy" refers to the average of the so-called Boltzman-style distribution of energy for the energetic species. In a low density plasma, the electron energy distribution can be related by the ratio of the electric field strength sustaining the plasma to the discharge pressure (E/p). The plasma power density P is a function of the wattage, pressure, flow rates of gases, etc., as known to the skilled artisan. Background information on plasma technology, hereby incorporated by reference, include the following: A. T. Bell, Proc. Intl. Conf. Phenom. Ioniz. Gases, "*Chemical Reaction in Nonequilibrium Plasmas*", 19–33 (1977); J. M. Tibbitt, R. Jensen, A. T. Bell, M. Shen, Macromolecules, "*A Model for the Kinetics of Plasma Polymerization*", 3, 648–653 (1977); J. M. Tibbitt, M. Shen, A. T. Bell, J. Macromol. Sci.-Chem., "*Structural Characterization of Plasma-Polymerized Hydrocarbons*", A10, 1623–1648 (1976); C. P. Ho, H. Yasuda, J. Biomed, Mater. Res., "*Ultrathin coating of plasma polymer of methane applied on the surface of silicone contact lenses*", 22, 919–937 (1988); H. Kobayashi, A. T. Bell, M. Shen, Macromolecules, "*Plasma Polymerization of Saturated and Unsaturated Hydrocarbons*", 3, 277–283 (1974); R. Y. Chen, U.S. Pat. No. 4,143,949, Mar. 13, 1979, "*Process for Putting a Hydrophilic Coating on a Hydrophobic Contact lens*"; and H. Yasuda, H. C. Marsh, M. O. Bumgarner, N. Morosoff, J. of Appl. Poly. Sci., "*Polymerization of Organic Compounds in an Electroless Glow Discharge. VI. Acetylene with Unusual Comonomers*", 19, 2845–2858 (1975).

Based on this previous work, the effects of changing pressure and discharge power on the rate of plasma modification can be understood. The rate generally decreases as the pressure is increased. Thus, as pressure increases the value of E/p, the ratio of the electric field strength sustaining the plasma to the gas pressure, decreases and causes a decrease in the average electron energy. The decrease in electron energy in turn causes a reduction in the rate coefficient of all electron-molecule collision processes. A further consequence of an increase in pressure is a decrease in electron density. Providing that the pressure is held constant, there should be a linear relationship between electron density and power.

In practice, contact lenses may be surface treated by placing them, in their unhydrated state, within an electric glow discharge reaction vessel (e.g., a vacuum chamber). Such reaction vessels are commercial available. The lenses may be supported within the vessel on an aluminum tray (which acts as an electrode) or with other support devices designed to adjust the position of the lenses. The use of a specialized support devices which permit the surface treatment of both sides of a lens are known in the art and may be used in the present invention.

The gas employed in the plasma treatment comprises an oxidizing media such as, for example, air, water, hydrogen peroxide, $O_2$ (oxygen gas), or combinations thereof, at a electric discharge frequency of, for example, 13.56 MHz, suitably between about 100–1000 watts, preferably 200 to 800 watts, more preferably 300 to 500 watts, at a pressure of about 0.1–1.0 Torr. The plasma treatment time is preferably greater than 4 minutes per side, more preferably about 6 to 60 minutes per side, most preferably about 8 to 40 minutes per side for effective but efficient manufacture. It is preferred that a relatively "strong" oxidizing plasma is utilized in this initial oxidation, e.g. ambient air drawn through a 3 to 30% by weight, preferably 4 to 15%, more preferably 5 to 10% hydrogen peroxide solution, preferably at a flow rate of 50 to 500 sccm, more preferably 100 to 300 sccm.

Such plasma treatment directly results in a fairly thick smooth film which may approach the point where the optical clarity is affected, that is, about 1500 angstroms. Preferably, the postplasma coating thickness should be greater than 1 000 angstroms.

In order to obtain the desired coating, the process parameters may be adjusted in order to obtain a combination of ablation and glass formation that results in the desired coating as subjected to further processing steps. The thickness of the coating is sensitive to plasma flow rate and chamber temperature. Higher flow rates tend to cause more ablation; lower pressures tend to produce thicker coatings of hydrophilic character. However, higher temperatures may tend to result in a surface that is less glassy and less cohesive.

Since the coating is dependent on a number of variables, the optimal variables for obtaining the desired or optimal coating may require some adjustment. If one parameter is adjusted, a compensatory adjustment of one or more other parameters may be appropriate, so that some routine trial and error experiments and iterations thereof may be necessary in order to achieved the coating according to the present invention. However, such adjustment of process parameters, in light of the present disclosure and the state of the art in plasma treatment, should not involve undue experimentation. As indicated above, general relationships among process parameters are known by the skilled artisan, and the art of plasma treatment has become well developed in recent years. The Examples below provide the Applicants' best mode for forming the coating on a silicone hydrogel lens.

Subsequent to surface treatment (8) in FIG. 1, the lens is preferably subjected to extraction (9) to remove residual monomers and non-crosslinked polymers or oligomers in the lenses. Generally, in the manufacture of contact lenses, some of the monomer mix is not fully polymerized. The incompletely polymerized material from the polymerization process may affect optical clarity or may be harmful to the eye. Residual material may also include solvents not entirely removed by the previous solvent removal operation or even additives that may have migrated from the mold used to form the lens.

Conventional methods to extract such residual materials from the polymerized contact lens material include extraction With an alcohol solution for several hours (for extraction of hydrophobic residual material) followed by extraction with water (for extraction of hydrophilic residual material). Thus, some of the alcohol extraction solution remains in the polymeric network of the polymerized contact lens material, and should be extracted from the lens material before the lens may be worn safely and comfortably on the eye. Extraction of the alcohol from the lens can be achieved employing heated water for several hours. Extraction should be as complete as possible, since incomplete extraction of residual material from lenses may contribute adversely to the useful life of the lens. Also, such residuals may impact lens performance and comfort by interfering with optical clarity or the desired uniform hydrophilicity of the lens surface. It is important that the selected the extraction solution in no way adversely affects the optical clarity of the lens. Optical clarity is subjectively understood to be the level of clarity observed when the lens is visually inspected.

Subsequent to extraction (9), the lens is subjected to hydration (10), in which the lens may be fully hydrated with water or buffered saline. When the lens is ultimately fully hydrated (wherein the lens typically may expand by 10 to about 20 percent or more), the coating remains intact and bound to the lens, providing a durable, hydrophilic coating which has been found to be resistant to delamination. The lens may be hydrated with a solution containing the silicon-containing agent according to the present invention. Alternatively, the lens may be placed in a solution according to the present invention following hydration.

Following hydration (10), the lens should undergo cosmetic inspection (11), wherein trained inspectors inspect the contact lenses for clarity and the absence of defects such as holes, particles, bubbles, nicks, and tears. Inspection is preferably at 10×magnification. After the lens has passed cosmetic inspection (11), the lens is ready for packaging (12), whether in a vial, plastic blister package, or other container for maintaining the lens in a sterile condition for the consumer. Finally, the packaged lens is subjected to sterilization and simultaneous silica treatment (13), which may be accomplished in a conventional autoclave, preferably under an air pressurization sterilization cycle, sometime referred to as an air-steam mixture cycle, as will be appreciated by the skilled artisan. Preferably the autoclaving is at 100° C. to 200° C. for a period of 10 to 120 minutes. Following sterilization, the lens dimensions of the sterilized lenses may be checked prior to storage.

Following the hydration and sterilization steps, the silicate-containing coating produced by plasma treatment has been modified to its final form. In a preferred embodiment, the coating displays a mosaic pattern of projecting plates surrounded by receding fissures, akin in appearance to closely spaced islands surrounded by rivers. When viewing a 50×50 square micron image by Atomic Force Microscopy, the peak-to-valley distances (or depth) of the fissures is on average between about 100 and 500 angstroms, and the plate coverage (or surface coverage) is on average between about 40% and 99%. The depth of the fissures can be considered to be a measurement of the "coating thickness," wherein the fissures expose the underlying hydrogel material under the silicate-containing, glass-like coating,. Preferably, the plate coverage is on average about 50% to 90 percent, more preferably 60 to 80%, in the final product.

The treatment of the silicone hydrogel contact lens with the silicon-containing solution during autoclaving helps to maintain the silicate coating under the rigorous conditions of sterilization. Thus, the silicon-containing agents in the solution contributes to the desired final coating and/or improves its final characteristics, including its hydrophilicity. The heating accelerates and promotes the precipitation of the silica onto the lens.

The lens may remain in the same solution subsequent to the autoclaving, which is particularly desirable if the lens is autoclaved in a sealed plastic blister pack. Thus, the present invention is also useful for packaging and storing contact lens, the method comprising packaging a contact lens immersed in an aqueous contact-lens solution, wherein the contact-lens solution comprises about 0.01 to 3.0, preferably about 0.02 to 2.0, more preferably about 0.03 to 1.0 percent by weight (dry weight) of soluble silicate, silicic acid, or collodial silica, or combinations thereof. Thus, according to one embodiment of the present invention, a contact lens may be immersed in the silicon-containing aqueous solution prior to delivery to the customer-wearer, during manufacture of the contact lens. Preferably the solution, both during autoclaving and in the final package, comprises greater than 90% by weight water, preferably about 93 to 99% by weight water. Consequently, a package for delivery to a customer may comprise a sealed container containing one or more unused contact lens immersed in an aqueous solution according to the present invention. Accordingly, one aspect or embodiment of the invention is directed to a system for the storage and delivery of a contact lens comprising a sealed container, for example a glass vial or a conventional plastic blister package, containing one or more unused contact lens immersed in a solution comprising a silicon-containing solution, since some if not most of the silicon-containing material can remain in solution, preferably in the amount of 0.01 to 1.5 weight percent, more preferably 0.02 to 1.0 percent by weight (dry) in solution, even if some is deposited on the lens. Blister packs typically comprise a concave well adapted for containing the contact lens, which well is covered by a metal or plastic sheet adapted for peeling in order to open the hermetically sealed blister-pack.

In accordance with this aspect of the invention, therefore, a sterile ophthalmically safe aqueous storage solution comprising a soluble silicate, silicic acid, colloidal silica, or combinations thereof, may be used as a packaging solution for a contact lens. Such packaging solution must be physiologically compatible. Specifically, the solution must be "ophthalmically safe" for use with a contact lens, meaning that the contact lens may be directly taken from its package for direct placement on the eye without first rinsing the lens with another solution, that is, a solution according to the present invention is safe for direct contact with the eye via a contact lens that has been immersed in, or wetted with, the solution. An ophthalmically safe solution has an osmolality and pH that is compatible with the eye and comprises materials, and amounts thereof, that are non-cytotoxic according to ISO standards and U.S. FDA (Food & Drug Administration) regulations. The solution should be sterile in that the absence of microbial contaminants in the product prior to release must be statistically demonstrated to the degree necessary for such products.

The packaging solution according to the present invention may contain, in addition to the silicon-containing component, an effective amount of at least one osmolality adjusting agent. Preferably, the aqueous solutions of the present invention for packaging contact lenses are adjusted with such agents to approximate the osmotic pressure of normal lachrymal fluids which is equivalent to a 0.9 percent solution of sodium chloride or 2.5 percent of glycerol solution, although opthalmologically safe variations are acceptable.

The solutions may be made substantially iso-osmotic with physiological saline used alone or in combination with other ingredients. Examples of suitable tonicity adjusting agents include, but are not limited to, sodium and potassium chloride, dextrose, glycerin, calcium and magnesium chloride. These agents are typically used individually in amounts ranging from about 0.01 to 2.5% (w/v) and preferably, from about 0.2 to about 1.5% (w/v). Preferably, the tonicity agent will be employed in an amount to provide a final osmotic value of 200 to 450 mOsm/kg and more preferably between about 250 to about 350 mOsm/kg, and most preferably between about 280 to about 320 mOsm/Kg.

The pH of the solution in the package should be maintained within the range of 5.0 to 8.0, more preferably about 6.0 to 8.0, most preferably about 6.5 to 7.8. Suitable buffers may be added, such as boric acid, sodium borate, potassium citrate, citric acid, sodium bicarbonate, TRIS, and various mixed phosphate buffers (including combinations of $Na_2HPO_4$, $NaH_2PO_4$ and $KH_2PO_4$) and mixtures thereof. Borate buffers are preferred, particularly for enhancing the solubility of silicates. Generally, buffers will be used in amounts ranging from about 0.05 to 2.5 percent by weight, and preferably, from 0.1 to 1.5 percent. The packaging solutions of this invention preferably contain a borate buffer containing one or more of boric acid, sodium borate, potassium tetraborate, potassium metaborate or mixtures of the same.

The examples presented below are provided as a further guide to the practitioner of ordinary skill in the art and are not to be construed as limiting the invention in any way.

EXAMPLE 1

This example discloses a representative silicone hydrogel lens material used in the following Examples. The formulation for the material is provided in Table 1 below.

TABLE 1

| Component | Parts by Weight |
|---|---|
| TRIS-VC | 55 |
| NVP | 30 |
| $V_2D_{25}$ | 15 |
| VINAL | 1 |
| n-nonanol | 15 |
| Darocur | 0.2 |
| tint agent | 0.05 |

The following materials are designated above:

| | |
|---|---|
| TRIS-VC | tris(trimethylsiloxy)silyipropyl vinyl carbamate |
| NVP | N-vinyl pyrrolidone |
| $V_2D_{25}$ | a silicone-containing vinyl carbonate as previously described in U.S Pat. No. 5,534,604. |
| VINAL | N-vinyloxycarbonyl alanine |
| Darocur | Darocur-1173, a UV initiator |
| tint agent | 1,4-bis[4-(2-methacryloxyethyl) phenylamino] anthraquinone |

Comparative Example 2

This comparative example illustrates a plasma treated lens before treatment according to the present invention. Silicone hydrogel lenses made using the formulation of Example 1 above were cast molded from polypropylene molds. Under an inert nitrogen atmosphere, 45-$\mu$l of the formulation was injected onto a clean polypropylene concave mold half and covered with the complementary polypropylene convex mold half. The mold halves were compressed at a pressure of 70 psi and the mixture was cured for about 15 minutes in the presence of UV light (6–11 mW/cm$^2$ as measured by a Spectronic UV meter). The mold was exposed to UV light for about 5 additional minutes.

The top mold half was removed and the lenses were maintained at 60° C. for 3 hours in a forced air oven to remove n-nonanol. Subsequently, the lens edges were ball buffed for 10 seconds at 2300 rpm with a force of 60 g. The lenses were then plasma treated as follows. The lenses were placed concave side up on an aluminum coated tray and the tray placed into a plasma treatment chamber. The atmosphere was produced by passing air at 400 sccm into the chamber through an 8% hydrogen peroxide solution, resulting in an Air/$H_2O$/$H_2O_2$ gas mixture. The lenses were plasma treated for a period of 8 minutes (350 watts, 0.5 Torr). The chamber was then backfilled to ambient pressure. The tray was removed from the chamber, the lenses flipped over, and the procedure repeated to plasma treat the other side of the lenses.

Lenses were analyzed directly from the plasma chamber and after full processing. Full processing included, following plasma treatment, extraction, hydration and autoclave sterilization. Extraction employed isopropanol at room temperature for 4 hours (during commercial manufacture a minimum of 48 hours following by extraction in water at about 85° C. for 4 hours is preferred). The lenses were then immersed in buffered saline for hydration. Autoclaving was carried out with the lenses, within vials, immersed in a conventional aqueous packaging solution, for comparison (in Example 3 below) to the use of a silicon-containing solution according to the present invention.

The plasma chamber was a direct current DC RFGD chamber manufactured by Branson GaSonics Division (Model 7104). This chamber was a cold equilibrium planar configuration which had a maximum power of 500 watts. All lenses were prepumped to 0.01 Torr prior to any plasma treatment from residual air in the chamber. This process reduced the relative treatment level of the polymer by controlling gas pressure.

All lenses in this study were analyzed as received. The pre-plasma and post plasma lenses were analyzed dry. The fully processed lenses were removed from the vials and desalinated in HPLC grade water in a static fashion for a minimum of 15 minutes. Three lens posteriors and three lens anteriors from the pre-plasma, post plasma, and fully process lenses of each lot were analyzed by X-ray Photoelectron Spectroscopic (XPS).

The XPS data was acquired by a Physical Electronics [PHI] Model 5600 Spectrometer. To collect the data, the instrument's aluminum anode was operated at 300 watts, 15 kV, and 20 mA. The Al Kα line was the excitation source monochromatized by a toroidal lens system. A 7 mm filament was utilized by the X-ray monochromator to focus the X-ray source which increases the need for charge dissipation through the use of a neutralizer. The base pressure of the instrument was 2.0×10-10 Torr while during operation it was 1.0×10-9 Torr. A hemispherical energy analyzer measures electron kinetic energy. The practical sampling depth of the instrument, with respect to carbon, at a sampling angle of 45°, is approximately 74 angstroms. All elements were charge corrected to the peak of carbon binding energy of 285.0 eV.

Each of the plasma modified specimens were analyzed by XPS utilizing a low resolution survey spectra [0–1100 eV] to identify the elements present on the sample surface. The high resolution spectra were performed on those elements detected from the low resolution scans. The elemental composition was determined from the high resolution spectra. The atomic composition was calculated from the areas under the photoelectron peaks after sensitizing those areas with the instrumental transmission function and atomic cross sections for the orbital of interest. Since XPS does not detect the presence of hydrogen or helium, these elements will not be included in any calculation of atomic percentages. The atomic composition data has been outlined in Table 2.

TABLE 2

|  |  | Oxygen | Nitrogen | Carbon | Silicon | Fluorine |
|---|---|---|---|---|---|---|
| Experiment 1 |  |  |  |  |  |  |
| pre-plasma | AVG | 18.6 | 6.2 | 64.7 | 10.5 | 0.0 |
|  | STDEV | 1.2 | 0.4 | 1.3 | 0.7 | 0.0 |
| post-plasma | AVD | 47.6 | 3.1 | 29.0 | 18.9 | 1.6 |
|  | STDEV | 1.3 | 0.2 | 1.3 | 0.3 | 0.1 |
| fully processed | AVG | 19.5 | 7.8 | 64.8 | 7.9 | 0.0 |
|  | STDEV | 0.8 | 0.3 | 0.9 | 0.3 | 0.0 |
| Experiment 2 |  |  |  |  |  |  |
| pre-plasma | AVG | 18.0 | 6.0 | 65.2 | 10.8 | 0.0 |
|  | STDEV | 0.5 | 0.5 | 0.9 | 0.7 | 0.0 |
| post plasma | AVG | 49.4 | 2.7 | 26.5 | 20.1 | 1.4 |
|  | STDEV | 1.5 | 0.3 | 2.0 | 0.9 | 0.2 |
| fully processed | AVG | 19.6 | 7.7 | 64.8 | 7.8 | 0.0 |
|  | STDEV | 0.3 | 0.3 | 0.8 | 0.7 | 0.0 |
| Experiment 3 |  |  |  |  |  |  |
| pre-plasma | AVG | 18.1 | 6.0 | 66.8 | 9.1 | 0.0 |
|  | STDEV | 1.2 | 0.7 | 1.5 | 0.8 | 0.0 |
| post plasma | AVG | 50.2 | 1.7 | 22.0 | 23.1 | 2.6 |
|  | STDEV | 1.3 | 0.3 | 1.9 | 1.0 | 0.5 |

Each experiment involved testing 6 lens from the sample lot of 50 to 100 lenses. The survey spectra for the pre-plasma lenses of Experiments 1 to 3 contain photoelectron peaks indicative of oxygen, nitrogen, carbon, and silicon. The silicon $2p_{3/2}$ peak position (102.4 eV) indicates that the detected silicon on the surface originated from derivatives of silicone. The survey spectra for the post-plasma lenses of the Experiments 1 to 3 contain photo-electron peaks indicative of oxygen, nitrogen, carbon, silicon, and fluorine. The fluorine is a by-product of the plasma ablation of the Teflon runners which support the trays used to hold the lenses. The silicon $2p_{3/2}$ photoelectron peak position (103.7 eV) indicates that the detected silicon on the surface originated from silicates, verifying the presence of a coating. As evidenced, slight differences in the elemental analyses for different experiments may result from slight variations in the plasma processing parameters, location in the chamber, or as a result of inherent surface properties of the lenses of this particular lot.

In addition, Atomic Force Microscopy (AFM) was employed to study the morphology of the contact lens surfaces. AFM works by measuring nano-scale forces ($10^{-9}$ N) between a sharp probe and atoms on the lens surface. The probe is mounted on a cantilever substrate. The deflection of the cantilever, measured by a laser detection system, is processed to generate height information. While gathering height information, the probe is rastered in the x-y plane to generate a three dimensional topographical image of the lens surface. In the optical zone of each lens, three images were sampled on both sides of the lens.

Figure 2:
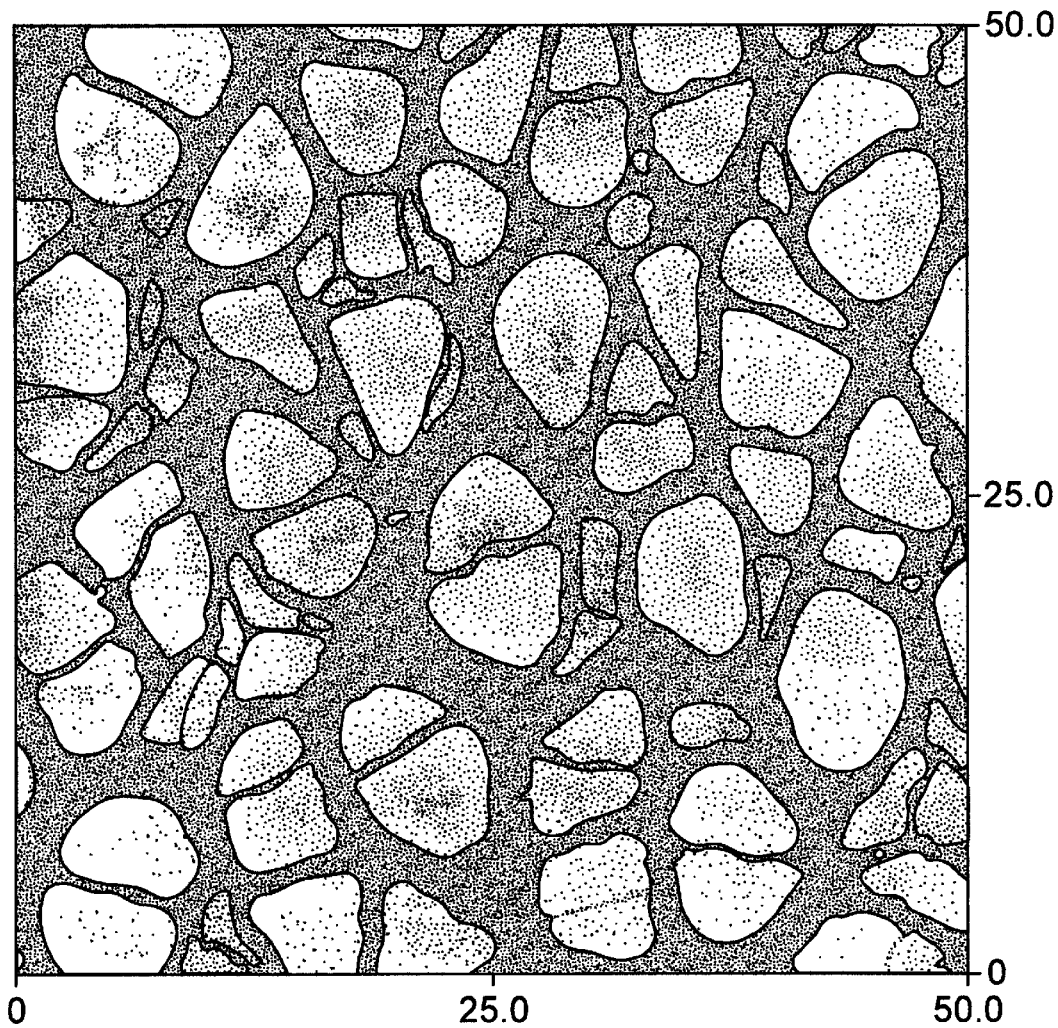
FIG. 2 is an Atomic Force Microscopy (AFM) topographical image (50×50 microns) for comparison showing the surface of an unautoclaved plasma-treated lens (negative control) for comparison to the FIG. 4.
Figure 2:
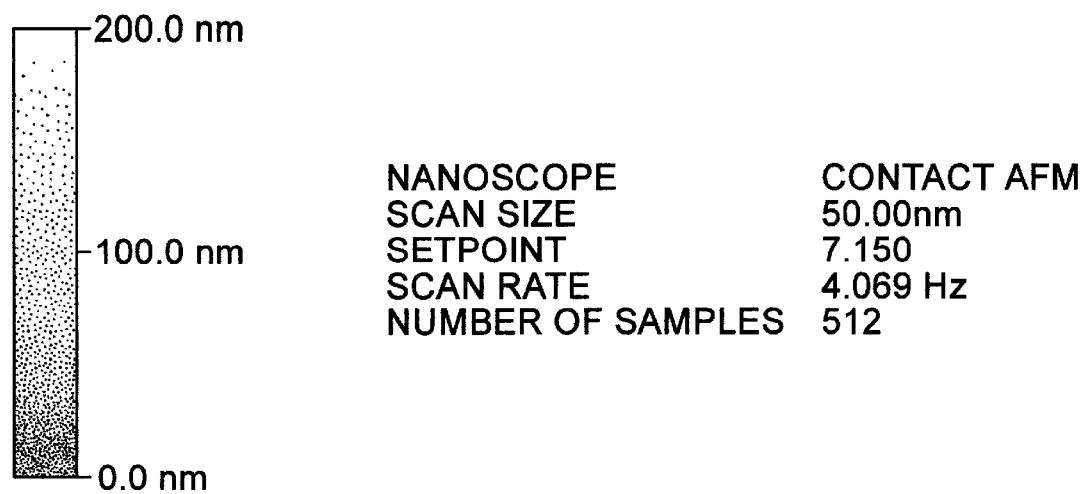

FIG. 2 is an Atomic Force Microscopy (AFM) topographical image (50×50 microns) showing the surface of an unautoclaved plasma-treated lens (negative control) for comparison to the lens surface of Example 4 below. The image shows a lens coating with a smooth surface very similar to the surface before plasma treatment. This is because most plasma coatings are conformal to the original surface. As evident, the surface is not perfectly smooth. The surfaces show some fine multidirectional scratches due to tooling marks.

Figure 3:
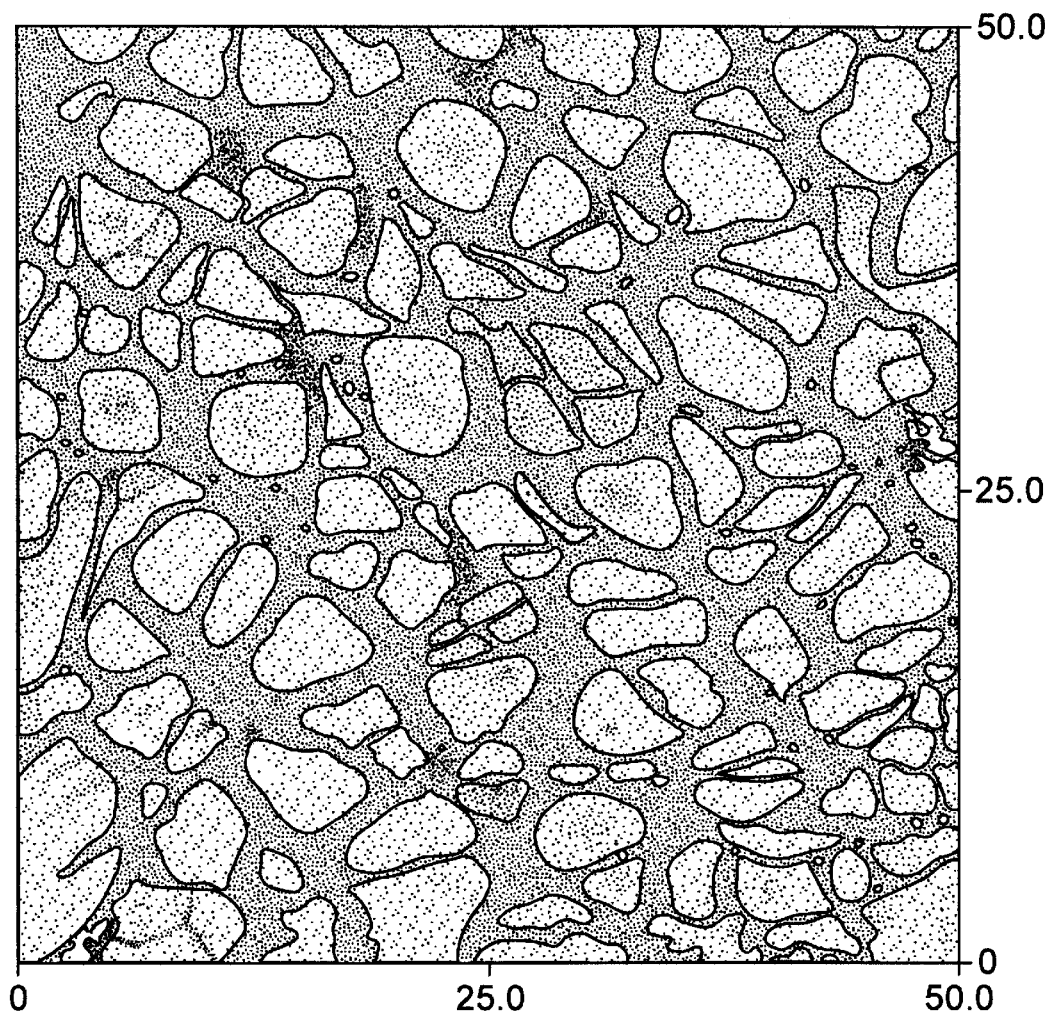
FIG. 3 is an Atomic Force Microscopy (AFM) topographical image (50×50 microns) showing the surface of a fully processed, autoclaved plasma-treated lens also for comparison purposes (positive control).
Figure 3:

The coloring (or shading in the FIGS.) in the AFM images represent distinct heights on the surface. The lighter areas correspond to the raised features, while the dark areas correspond to the recessed features. FIG. 3 is an Atomic Force Microscopy (AFM) topographical image (50×50 microns) showing the surface of a fully processed, autoclaved plasma-treated lens (positive control) also for comparison to the lens surface of Example 3 below in which the lens was fully processed according to the present invention. In the image of FIG. 3, it is apparent that the coating has cracked and flaked away, exposing the surface of the lens, therefore showing a relatively smooth surface with barely visable plates.

The fraction of the lens surface that is covered by the coating is referred to as "plate coverage" or "surface coverage." This measurement is sometimes easily made by looking at a histogram of the surface heights. However, when the coating is too thin, (<10 nm) the coverage is not attainable from the histogram. When this occurs, the AFM image in question is compared to previous AFM images of which the exact coverage is known. When this visual method is used, the coverage is estimated and correct to within ±10%.

EXAMPLE 3

This Example illustrates the preparation of a silicon-containing solution according to the present invention. The ingredients listed in Table 3 below were employed in preparing the solution.

TABLE 3

| Ingredient | mg/gm | % w/w |
|---|---|---|
| Sodium Silicate, K grade(a 31.7% solution from PQ Corporation) | 1.25 | 0.0396** |
| Boric Acid | 8.5 | 0.850 |
| Sodium Borate | 0.9 | 0.090 |
| Sodium Chloride | 4.5 | 0.450 |
| Hydrochloric Acid, 1N | 4.5 | 0.450 |
| Sodium Hydroxide, 1N | As needed* | pH 7.1–7.4 |
| Purified Water q.s. to | 1.0 gm | 100 % |

*As needed to adjust pH.
**based on dry weight

Into an appropriate stainless steel vessel, equipped with agitation, purified water was formed a first solution as follows. Water was added in an amount equivalent to 80% of the total water volume, and agitation was initiated and maintained throughout the processing of the batch. In the order listed were added and dissolved the batch quantities of sodium chloride, boric acid, and sodium borate. The solution was mixed for a minimum of 10 minutes to ensure complete dissolution. In a separate container, a second solution was formed as follows. Stock solution of sodium silicate was prepared at a concentration of 0.396% in purified water equivalent to 10% of the total water volume. The solution was filtered through a 0.45 $\mu$m filter. The filtered sodium silicate stock solution was then added to the first solution. The Hydrochloric acid (1N) was slowly added to this solution, and the pH was adjusted, if necessary, with additional 1N Hydrochloric Acid or 1N Sodium Hydroxide solution. The remaining purified water was added to bring the batch to 100% of volume. The final product should have a pH at 25° C. of 7.0–7.4, an osmolality of 270–330 mOsm/Kg, and visual clarity (colorless to clear pale yellow).

EXAMPLE 4

As an illustration of the subject invention, a series of unhydrated silicone hydrogel lenses were casted and then subjected to the plasma surface treatment as described above in Comparative Example 2, followed by the extraction of low molecular weight oligomers and monomers from the lenses. Samples of the plasma-treated lenses were then immersed in various concentrations of sodium silicate, autoclaved, and subsequently submitted for AFM surface imaging. In all, nine lots labeled A through I were autoclaved. All silicate-treated silicone lens lots were then analyzed as received. The lenses were removed from their vials and desalinated in HPLC grade water in a static fashion for a minimum of 15 minutes. All lenses were cut with a clean scalpel on a clean glass substrate. The lenses were measured according to the methods listed below.

All samples were analyzed by AFM on posterior and anterior sides in the dry state. The samples were placed in contact with the AFM cantilever and analyzed in three areas per side. A 50×50 $\mu$m image was taken per spot.

As indicated in Table 4 below, Lots A to F are lenses autoclaved in one of three sodium silicate solutions at a high of (0.16%) and a low of (0.016%) concentration. The topography of the anterior and posterior of each lens was analyzed in the dry state. There were no significant differences as far as topography between lots B, D, F and G, indicating that lenses autoclaved in a solution having 0.05% silicate showed no difference in surface topography (RMS) from a lens autoclaved without the silicate. Lots B, D, F and G showed a transitional surface topography with a crack depth under 16 nm and an RMS of 9 nm. On the other hand, lots C and E exhibited a crack depth of 18 to 25 nm with an RAPS of 16 nm, and lot A and H had a crack depth of 35 to 45 nm with an RMS of 17 nm, indicating that lenses autoclaved in a solution having 0.5% silicate showed a coating thickness comparable to a lens that had not been autoclaved. The data in Table 4 below reflects the RMS roughness (Root Mean Square) for fully processed lenses. While to a certain degree the RMS roughness is an indication of the coating thickness, it is desirable to maintain the RMS roughness less than 30 nm, preferably less than not more than 20 nm.

TABLE 4

| Sample | | Treatment | Roughness RMS |
|---|---|---|---|
| A | anterior | 0.16% silicate | mean = 12.3 nm std. dev. = .02 |
|   | posterior |   | mean = 17.1 nm std. dev. = 1.7 |
| B | anterior | 0.016% silicate | mean = 09.1 nm std. dev. = 3.2 |
|   | posterior |   | mean = 13.0 nm std. dev. = .60 |
| C | anterior | 0.16% silicate | mean = 19.2 nm std. dev. = 6.2 |
|   | posterior |   | mean = 13.0 nm std. dev. = 0.6 |
| D | anterior | 0.016% silicate | mean = 0.6.6 nm std. dev. = 1.4 |
|   | posterior |   | mean = 08.1 nm std. dev. = 1.3 |
| E | anterior | 0.16% silicate | mean = 13.1 nm std. dev. = .02 |
|   | posterior |   | mean = 16.0 nm std. dev. = 3.1 |
| F | anterior | 0.016% silicate | mean = 10.2 nm std. dev. = 5.5 |
| G | posterior |   | mean = 11.2 nm std. dev. = 3.2 |
|   | anterior | negative control | mean = 09.1 nm std. dev. = 0.5 |
|   | posterior | (0% silicate) with autoclaving | mean = 10.3 nm std. dev. = 1.4 |
| H | anterior | positive control | mean = 15.1 nm std. dev. = 0.2 |
|   | posterior | (before autoclaving) | mean = 22.1 nm std. dev. = 3.2 |

Figure 4:
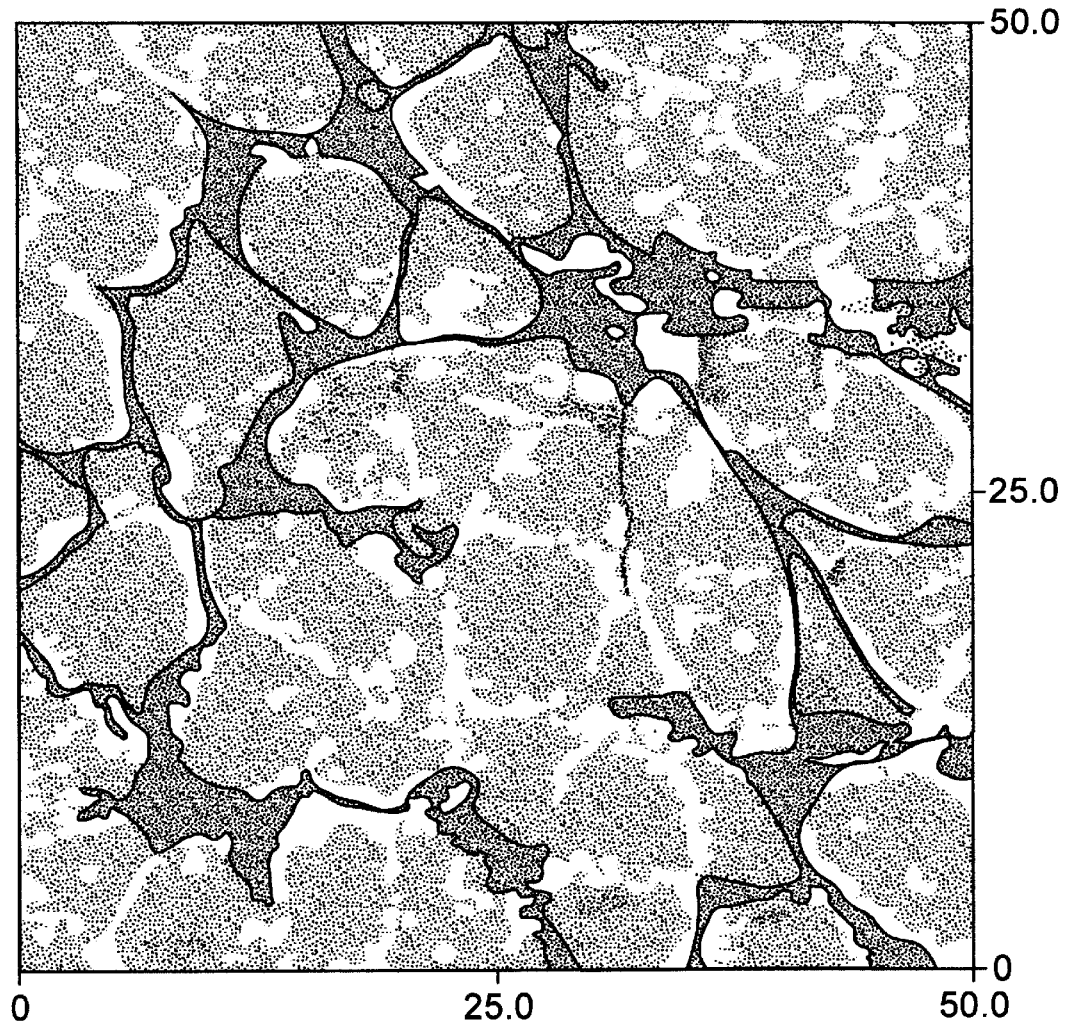
FIG. 4 shows an Atomic Force Microscopy (AFM) topographical image (50×50 microns) showing the surface of a fully processed, unautoclaved plasma-treated lens that has been treated with a dilute aqueous sodium silicate (0.04 weight percent) solution according to the present invention in order to help retain and/or improve the silicate-containing film produced by the plasma treatment.
Figure 4:
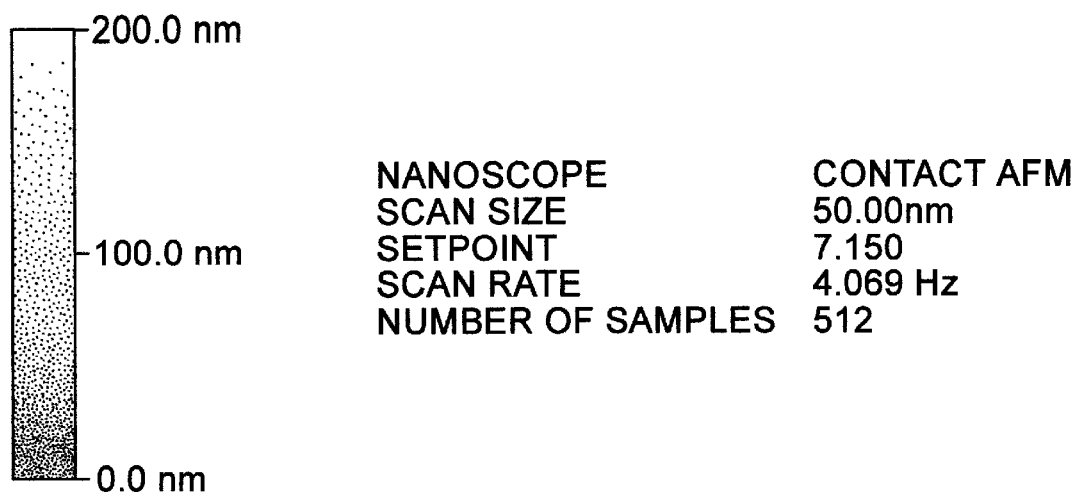
Figure 5:
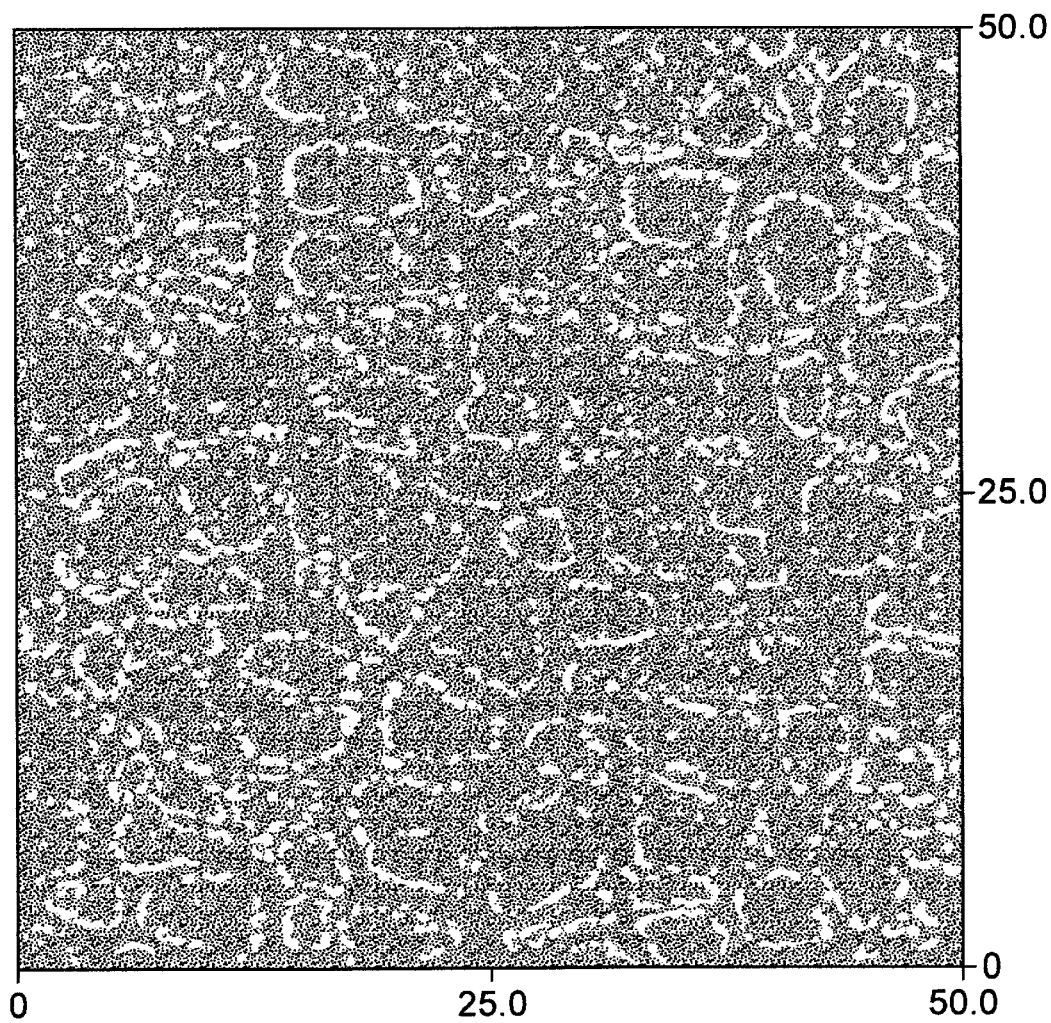
FIG. 5 shows an Atomic Force Microscopy (AFM) topographical image (50×50 microns) showing the surface of a fully processed, unautoclaved plasma-treated lens that has been treated with a dilute aqueous sodium silicate (0.16 weight percent) solution according to the present invention in order to help retain and/or improve the silicate-containing film produced by the plasma treatment.
Figure 5:
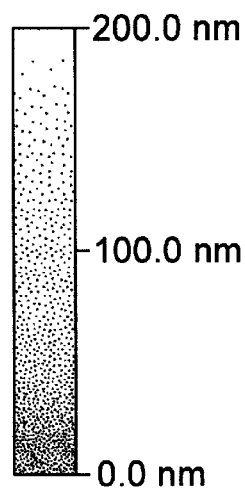

The result of these AFM investigations indicated significant topographic differences for lenses autoclaved in a 0.16% silicate solution, as mentioned above. Further experiments were performed using 0.0396 weight percent silicate. FIG. 4 shows an Atomic Force Microscopy (AFM) topographical image (50×50 microns) according to the present invention showing a fully processed, autoclaved plasma-treated lens that has been treated with a dilute aqueous sodium silicate (0.16 weight percent) solution in order to help retain the silicate-containing coating and/or to improve the silicate-containing coating produced by the plasma treatment. It is evident that the surface topography of FIG. 2 (pre-autoclaving) has been substantially retained in FIG. 4 (using a silicate solution) compared to the surface topography of FIG. 3 (autoclaving without the silicate solution). FIG. 5 shows a fully processed, autoclaved plasma-treated lens that has been treated with a dilute aqueous sodium silicate (0.040 weight percent) solution. Comparing FIG. 4 to FIG. 5, some silica deposition on the lens surface, which deposition is acceptable (safe) and may contribute to surface wettability, is noted at relatively higher silicate concentrations.

EXAMPLE 5

This Example illustrates the properties of a plasma-treated silicone lens treated, according to the present invention, with a silicate solution during autoclaving compared to such a lens autoclaved in a conventional saline solution. To show the change in wetting properties of the lenses according to the present invention, contact angle measurements were made of an untreated lens (before plasma treatment), a plasma treated lens (immediately after plasma treatment), and a fully processed lens (after hydration and heat sterilization). The contact angle was measured as follows. A platinum wire (Pt) was employed to minimize contamination. The Pt wire was pulled across a flame over a Bunsen burner until the wire reached a dull red (orange) glow, in order to ensure that the water (HPLC grade) employed in the test was exposed to a fresh, clean metal surface, free from contamination. About 2 microliters of water was transferred from its bottle to the wire, which process involved tipping of the bottle so that the maximum amount of wire was under the liquid. The water on the wire was transferred, without dragging along the surface, to a lens made from the material of Example 1. Once transferred, an NRL-100 Rhamé-Hart Contact Angle Goniometer was employed to measure the contact angle. The baseline was set by adjusting the stage height until the baseline was drawn between the bottom of the drop and its own reflection. After finding the baseline, the contact angle formed by the drop was measured on the right and on the left. Another drop of water was added to the first drop, and then the contact angles were recalculated for the left and right sides. All four measurements were averaged. Employing this measurement, the lens surface before treatment exhibited a water contact angle of 91+/–8 dynes/cm. Following plasma treatment, the water contact angle was 0 dynes/cm. Following heat sterilization in a 0.04% sodium silicate solution, the fully processed lens exhibited a contact angle of 27+/–2 dynes/cm. In contrast, the same lens (untreated according to the present invention) that was processed without the use of the sodium silicate exhibited a contact angle 72.4+/–2 dynes/cm. All contact angle measurements were on dry lenses.

In general, lens treated according to the present invention, compared to lens untreated with silicate, showed no adverse effects of the treatment. Lenses treated according to the present invention showed no cytotoxicity (Agar Overlay Assay) compared to the negative control. The oxygen permeability (dK) for the treated lens (0.125% Na silicate treated disc) was 89.6 versus 94.7 for an untreated disc, showing no significant change in oxygen permeability. The treated lens showed the same optical clarity as the untreated lens. Other measurements are shown in Table 5 below.

TABLE 5

| | | Lens Dimensions | | |
| --- | --- | --- | --- | --- |
| Test | Sagittal Depth | Diameter | C.T. | Power |
| Silicate Treated Lens | 3.707 mm +/– 0.007 | 14.056 mm +/– 0.019 | 0.094 mm +/– 0.002 | –5.70 D +/– 0.093 |
| Untreated Lens | 3.695 mm +/– 0.027 | 14.097 mm +/– 0.022 | 0.095 mm +/– 0.008 | –5.71 D +/– 0.084 |

| | | Mechanical Properties | | |
| --- | --- | --- | --- | --- |
| Test | Modulus | Tensile St. | % Elong. | Tear |
| Silicate Treated Lens | 126.8 g/mm$^2$ +/– 7.71 | 64.5 g/mm$^2$ +/– 8.3 | 118.9% +/– 13.7 | 12.8 g/mm +/– 1.4 |
| Untreated Lens | 124.1 g/mm$^2$ +/– 10.6 | 7.8 g/mm$^2$ +/– 10.0 | 129.7% +/– 14.5 | 9.3 g/mm +/– 0.4 |

| | | | XPS | | |
| --- | --- | --- | --- | --- | --- |
| Test | % O | % N | % C | % Si | % Na |
| Not autoclaved | 30.9% +/– 3.4 | 5.9% +/– 0.6 | 51.5% +/– 4.1 | 11.0% +/– 1.2 | 07.% +/– 0.3 |
| Silicate Treated Lens | 46.1% +/– 1.5 | 3.1% +/– 03 | 31.2% +/– 1.8 | 18.9% +/– 0.6 | 0.6% +/– 0.0 |
| Untreated Lens | 22.6% +/– 0.4 | 7.6% +/– 0.3 | 62.8% +/– 0.2 | 6.5% +/– 0.1 | 0.4% +/– 0.0 |

Many other modifications and variations of the present invention are possible in light of the teachings herein. It is therefore understood that, within the scope of the claims, the present invention can be practiced other than as herein specifically described., the present invention can be practiced other than as herein specifically described.

What is claimed is:

1. A sterile ophthalmically safe aqueous composition for packaging contact lenses having a pH of about 5.0 to 8.0 comprising:

(a) from about 0.03 to 3.0 percent by weight of a surface-protective agent selected from the group consisting of a silicate salt, silicic acid, colloidal silica, and combinations thereof, (b) an effective amount of at least one osmolality adjusting agent such that the composition has substantially the same osmolality as tear fluid such that said composition may be placed directly in the eye without rinsing.

2. The composition of claim 1 further comprising an effective amount of a buffering agent.

3. The composition of claim 1 comprising, 93 to 99% by weight water.

4. The composition of claim 1 wherein the osmolality adjusting agent comprises an ophthalmologically suitable salt selected from the group consisting of an alkali metal or alkaline earth metal halide salt.

\* \* \* \* \*